US009043614B2

(12) United States Patent
Subramanian

(10) Patent No.: US 9,043,614 B2
(45) Date of Patent: *May 26, 2015

(54) DISCARDING SENSITIVE DATA FROM PERSISTENT POINT-IN-TIME IMAGE

(71) Applicant: NetApp, Inc., Sunnyvale, CA (US)

(72) Inventor: Ananthan Subramanian, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,071

(22) Filed: Sep. 20, 2013

(65) Prior Publication Data

US 2014/0025963 A1 Jan. 23, 2014

Related U.S. Application Data

(63) Continuation of application No. 12/113,143, filed on Apr. 30, 2008, now Pat. No. 8,589,697.

(51) Int. Cl.
*G06F 21/00* (2013.01)
*G06F 21/62* (2013.01)

(52) U.S. Cl.
CPC ............ *G06F 21/6218* (2013.01); *G06F 21/62* (2013.01); *G06F 2221/2107* (2013.01)

(58) Field of Classification Search
CPC .................... G06F 21/6218; G06F 2221/2107
USPC .................................................. 713/189, 193
See application file for complete search history.

(56) References Cited

U.S. PATENT DOCUMENTS

| 5,963,642 | A | 10/1999 | Goldstein |
| 5,990,810 | A | 11/1999 | Williams |
| 6,134,660 | A | 10/2000 | Boneh et al. |
| 6,604,118 | B2 | 8/2003 | Kleiman et al. |
| 6,678,828 | B1 | 1/2004 | Zhang et al. |
| 6,931,530 | B2 | 8/2005 | Pham et al. |
| 6,983,365 | B1 | 1/2006 | Douceur et al. |
| 7,047,420 | B2 | 5/2006 | Douceur et al. |
| 7,305,700 | B2 | 12/2007 | Boynton et al. |

(Continued)

FOREIGN PATENT DOCUMENTS

| WO | WO-01/06374 A2 | 1/2001 |
| WO | WO-2005050383 A2 | 6/2005 |

OTHER PUBLICATIONS

Kazeon Information Server, IS1200-ECS, Kazeon Systems, Inc. Data Sheet, "Kazeon® Search the Enterprise," http://www.kazeon.com/library2/downloads/IS1200-ECSDataSheet.pdf, 2 pages, (Oct. 17, 2007).

(Continued)

*Primary Examiner* — Mohammad A Siddiqi
(74) *Attorney, Agent, or Firm* — Perkins Coie LLP

(57) ABSTRACT

A network storage server implements a method to discard sensitive data from a Persistent Point-In-Time Image (PPI). The server first efficiently identifies a dataset containing the sensitive data from a plurality of datasets managed by the PPI. Each of the plurality of datasets is read-only and encrypted with a first encryption key. The server then decrypts each of the plurality of datasets, except the dataset containing the sensitive data, with the first encryption key. The decrypted datasets are re-encrypted with a second encryption key, and copied to a storage structure. Afterward, the first encryption key is shredded.

8 Claims, 10 Drawing Sheets

(56) References Cited

U.S. PATENT DOCUMENTS

| | | | |
|---|---|---|---|
| 7,428,642 B2 | 9/2008 | Osaki | |
| 7,577,689 B1 | 8/2009 | Masinter et al. | |
| 7,584,338 B1 | 9/2009 | Bricker et al. | |
| 7,627,756 B2 | 12/2009 | Fujibayashi et al. | |
| 7,752,492 B1* | 7/2010 | Armangau et al. | 714/6.13 |
| 7,757,086 B2* | 7/2010 | Walmsley | 713/171 |
| 7,840,537 B2 | 11/2010 | Gokhale et al. | |
| 7,904,732 B2 | 3/2011 | Cui et al. | |
| 8,117,464 B1 | 2/2012 | Kogelnik | |
| 8,266,430 B1* | 9/2012 | Lumb | 713/165 |
| 8,589,697 B2* | 11/2013 | Subramanian | 713/189 |
| 8,650,395 B2* | 2/2014 | Lumb | 713/165 |
| 2002/0099763 A1 | 7/2002 | Kondo et al. | |
| 2002/0103783 A1 | 8/2002 | Muhlestein | |
| 2003/0051172 A1 | 3/2003 | Lordemann et al. | |
| 2003/0177379 A1 | 9/2003 | Hori et al. | |
| 2004/0078566 A1 | 4/2004 | Barber et al. | |
| 2004/0230792 A1 | 11/2004 | McCarty | |
| 2005/0004924 A1 | 1/2005 | Baldwin | |
| 2005/0144202 A1* | 6/2005 | Chen | 707/205 |
| 2006/0085636 A1 | 4/2006 | Osaki | |
| 2006/0126468 A1 | 6/2006 | McGovern et al. | |
| 2006/0143476 A1 | 6/2006 | McGovern | |
| 2007/0038857 A1 | 2/2007 | Gosnell | |
| 2007/0136340 A1 | 6/2007 | Radulovich | |
| 2008/0005141 A1 | 1/2008 | Zheng et al. | |
| 2008/0013830 A1 | 1/2008 | Patterson et al. | |
| 2008/0063210 A1 | 3/2008 | Goodman et al. | |
| 2008/0082836 A1 | 4/2008 | Osaki | |
| 2008/0091655 A1 | 4/2008 | Gokhale et al. | |
| 2008/0140932 A1 | 6/2008 | Flynn et al. | |
| 2009/0171888 A1 | 7/2009 | Anglin | |
| 2009/0249005 A1 | 10/2009 | Bender et al. | |
| 2010/0131466 A1* | 5/2010 | Chen | 707/615 |
| 2011/0283113 A1* | 11/2011 | Moffat et al. | 713/189 |

OTHER PUBLICATIONS

Decru® A NetApp Company, Decru's Storage Security White Paper, Enterprise-Wide Storage Security with DataFort™ Appliances, http://www.decru.com/docs/businessdrivers/index.htm, 9 pages, (2005).

DataFort™ Platform, Decru DataFort™ Secruity Appliances, Decru® A NetApp Company, http://www.decru.com/products/datafort0.htm, Product Description, 3 pages, (Mar. 12, 2008).

DataFort® E-Series Datasheet, DataFort™ E-Series (NAS & IP-SAN), Decru DataFort® E-Series Storage Security Appliances, Decru® A NetApp Company, http://www.decru.com/products/dsEseries.htm, 3 pages, (Mar. 12, 2008).

Decru—Lifetime Key Management Software, Secure, Automated Key Archival and Recovery, Decru® A NetApp Company, http://www.decru.com/products/lkm_software.htm, Product Description, 3 pages, (Mar. 12, 2008).

Kazeon Systems Information Server IS1200, Storage management, Gold Award, 2005 Products of the Year, http://searchstorage.techtarget.com/productsOfTheYearWinner/0,296407,sid5_gci1162811_tax302767_ayr2005,00.html, 2 pages, (Mar. 12, 2008).

Kazeon Information Server, IS1200-FRM, Kazeon Systems, Inc. Data Sheet, "Kazeon® Search the Enterprise," http://www.kazeon.com/library2/downloads/IS1200-FRMDataSheet.pdf, 2 pages, (Jun. 15, 2007).

Kazeon IS1200-FRM for Storage Optimization, Data Consolidation, Kazeon Systems, Inc. Data Sheet, "Kazeon® Search the Enterprise," http://www.kazeon.com/products2/is1200-frm.php, 2 pages, (Mar. 12, 2008).

A. Adya, J. Bolosky, M. Castro, R. Chaiken, G. Cermak, J.R. Douceur, J. Howell, J.R. Lorch, M. Theimer, R.P. Wattenhofer; FARSITE: Federated. Available, and Reliable Storage for an incompletely Trusted Environment, Microsoft Corporation, Dec. 2002, retrieved from http://research.microsoft.com/apps/pubs/default.aspx?id=67917 on Apr. 28, 2011.

Zhu, B., Li, K., and Patterson, H. 2008. Avoiding the disk bottleneck in the data domain deduplication file system. In *Proceedings of the 6th USENIX Conference on File and Storage Technologies* (San Jose, California, Feb. 26-29, 2008). M. Baker and E. Riedel, Eds. USENIX Association, Berkeley, CA, 269-282-.

John R. Douceur, Atul Adya, William J. Bolosky, Dan Simon, Marvin Theimer; Reclaiming Space from Duplicate Files in a Serverless Distributed File System, Microsoft Corporation, Jul. 2002, retrieved from http://research.microsoft.com/apps/pubs/default.aspx?id=69954 on Apr. 28, 2011.

William J. Bolosky, Scott Corbin, David Goebel, and John R. Douceur; Single Instance Storage in Windows® 2000, Microsoft Corporation, Aug. 2000, retrieved from http://citeseerx.ist.psu.edu/viewdoc/download?doi=10.1.1.67.5656&rep=rep1&type=pdf on May 2, 2011.

Co-pending U.S. Appl. No. 12/110,046 of Bojinov, H., et al., filed Apr. 25, 2008.

Co-pending U.S. Appl. No. 12/113,122 of Kogelnik, C., filed Apr. 30, 2008.

Co-pending U.S. Appl. No. 12/110,114 of Singh, A., et al., filed Apr. 25, 2008.

Co-pending U.S. Appl. No. 12/113,143 of Subramanian, A., filed Apr. 30, 2008.

International Search Report PCT/US2009/041457 dated Dec. 23, 2009; pp. 1-4.

International Search Report PCT/US2009/042173 dated Dec. 16, 2009; pp. 1-4.

International Search Report PCT/US2009/041459 dated Dec. 23, 2009; pp. 1-3.

Written Opinion PCT/US2009/042173 dated Dec. 16, 2009; pp. 1-7.

Written Opinion PCT/US2009041457 dated Dec. 23, 2009; pp. 1-5.

Written Opinion PCT/US2009/041459 dated Dec. 23, 2009; pp. 1-4.

Non-Final Office Action Mailed Jan. 24, 2011 in Co-Pending U.S. Appl. No. 12/110,046 of Bojinov, H., et al., filed Apr. 25, 2008.

Non-Final Office Actiion Mailed Jun. 28, 2011 in Co-Pending U.S. Appl. No. 12/110,046 of Bojinov, H., et al., filed Apr. 25, 2008.

Final Office Action Mailed Dec. 6, 2011 in Co-Pending U.S. Appl. No. 12/110,046 of Bojinov, H., et al., filed Apr. 25, 2008.

Advisory Action Mailed Apr. 5, 2012 in Co-Pending U.S. Appl. No. 12/110,046 of Bojinov, H., et al., filed Apr. 25, 2008.

Supplemental Advisory Action Mailed Apr. 13, 2012 in Co-Pending U.S. Appl. No. 12/110,046 of Bojinov, H., et al., filed Apr. 25, 2008.

Non-Final Office Action Mailed May 31, 2011 in Co-Pending U.S. Appl. No. 12/113,122 of Kogelnik, C., filed Apr. 30, 2008.

Notice of Allowance Mailed Nov. 28, 2011 in Co-Pending U.S. Appl. No. 12/113,122 of Kogelnik, C., filed Apr. 30, 2008.

Non-Final Office Action Mailed Jan. 25, 2011 in Co-Pending U.S. Appl. No. 12/110,114 of Singh, A., et al., filed Apr. 25, 2008.

Non-Final Office Action Mailed Jul. 11, 2011 in Co-Pending U.S. Appl. No. 12/110,114 of Singh, A., et al., filed Apr. 25, 2008.

Final Office Action Mailed Dec. 23, 2011 in Co-Pending U.S. Appl. No. 12/110,114 of Singh, A., et al., filed Apr. 25, 2008.

Advisory Action Mailed Mar. 29, 2012 in Co-Pending U.S. Appl. No. 12/110,114 of Singh, A., et al., filed Apr. 25, 2008.

Non-Final Office Action Mailed Apr. 5, 2011 in Co-Pending U.S. Appl. No. 12/113,143 of Subramanian, A., filed Apr. 30, 2008.

Final Office Action Mailed Aug. 5, 2011 in Co-Pending U.S. Appl. No. 12/113,143 of Subramanian, A., filed Apr. 30, 2008.

Non-Final Office Action Mailed Nov. 28, 2011 in Co-Pending U.S. Appl. No. 12/113,143 of Subramanian, A., filed Apr. 30, 2008.

Final Office Action Mailed May 11, 2012 in Co-Pending U.S. Appl. No. 12/113,143 of Subramanian, A., filed Apr. 30, 2008.

Advisory Action Mailed Aug. 3, 2012 in Co-Pending U.S. Appl. No. 12/113,143 of Subramanian, A., filed Apr. 30, 2008.

Notice of Allowance Mailed Jun. 20, 2013 in Co-Pending U.S. Appl. No. 12/113,143 of Subramanian, A., filed Apr. 30, 2008.

Non-Final Office Action mailed Feb. 13, 2014 in Co-Pending U.S. Appl. No. 12/110,114 of Singh, A., et al., filed Apr. 25, 2008.

Written Opinion PCT/US2009/041459 dated Dec. 23, 2009; pp. 1.4.

Final Office Action mailed Nov. 28, 2014 in Co-Pending U.S. Appl. No. 12/110,114 of Singh, A., et al., filed Apr. 25, 2008.

* cited by examiner

|     | B1 | B2 | B3 | B4 | B5 | B6 | B7 | B8 | B9 |
|-----|----|----|----|----|----|----|----|----|----|
| AFS | K1 | K1 |    |    |    |    |    |    |    |

Fig. 6A

|       | B1 | B2 | B3 | B4 | B5 | B6 | B7 | B8 | B9 |
|-------|----|----|----|----|----|----|----|----|----|
| PPI 1 | K1 | K1 |    |    |    |    |    |    |    |
| AFS   |    | K1 | K2 | K2 |    |    |    |    |    |

Fig. 6B

|       | B1 | B2 | B3 | B4 | B5 | B6 | B7 | B8 | B9 |
|-------|----|----|----|----|----|----|----|----|----|
| PPI 1 | K1 | K1 |    |    |    |    |    |    |    |
| PPI 2 |    | K1 | K2 | K2 |    |    |    |    |    |
| AFS   |    | K1 |    | K2 | K3 | K3 |    |    |    |

Fig. 6C

|       | B1 | B2 | B3 | B4 | B5 | B6 | B7 | B8 | B9 |
|-------|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 |    |

Fig. 6D

|     | B1 | B2 | B3 | B4 | B5 | B6 | B7 | B8 | B9 |
|-----|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 | K4 |

Fig. 9A

|     | B1 | B2 | B3 | B4 | B5 | B6 | B7 | B8 | B9 |
|-----|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 |    |

Fig. 9B

|     | B1 | B2 | B3 | B4 | B5 | B6 | B7 | B8 | B9 |
|-----|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 | K4 |

Fig. 9C

|     | B1 | B2 | B3 | B4 | B5 | B6 | B7 | B8 | B9 |
|-----|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 |    |

Fig. 9D

|       | B1 | B2 | B3 | B4 | B5 | B6 | B7 | B8 | B9 |
|-------|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 | K4 |

Fig. 9E

|       | B1 | B2 | B3 | B4 | B5 | B6 | B7 | B8 | B9 |
|-------|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 |    |

Fig. 9F

|       | B1 | B2 | B3 | B4 | B5 | B6 | B7 | B8 | B9 |
|-------|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 |    |

Fig. 9G

|       | B1 | B2 | B3 | B4 | B5 | B6 | B7 | B8 | B9 |
|-------|----|----|----|----|----|----|----|----|----|
| PPI 1 | K1 | K1 |    |    |    |    |    |    |    |
| PPI 2 |    | K1 | K2 | K2 |    |    |    |    |    |
| PPI 3 |    | K1 |    | K2 | K3 | K3 |    |    |    |
| AFS   |    | K1 |    | K2 |    | K3 | K4 | K4 |    |

DISCARDING SENSITIVE DATA FROM PERSISTENT POINT-IN-TIME IMAGE

CROSS-REFERENCE TO RELATED APPLICATIONS

This application is a continuation of U.S. patent application Ser. No. 12/113,143, filed on Apr. 30, 2008, entitled DISCARDING SENSITIVE DATA FROM PERSISTENT POINT-IN-TIME IMAGE, which is incorporated herein by reference in its entirety.

FIELD OF THE INVENTION

At least one embodiment of the present invention pertains to network storage systems, and more particularly, to the discarding of sensitive data stored in a read-only Persistent Point-in-time Image (PPI) managed by a network storage system.

BACKGROUND

A storage server is a processing system that is used to store and retrieve data on behalf of one or more clients on a network. A storage server operates on behalf of one or more clients to store and manage data in a set of mass storage devices, such as magnetic, optical or solid-state storage-based disks or tapes. In conventional network storage systems, the mass storage devices can be organized into one or more groups of drives (e.g., redundant array of inexpensive drives (RAID)).

A storage server can be configured to service file-level requests from clients, as in the case of file servers used in a Network Attached Storage (NAS) environment. Alternatively, a storage server can be configured to service block-level requests from clients, as done by storage servers used in a Storage Area Network (SAN) environment. Further, some storage servers are capable of servicing both file-level and block-level requests, as done by certain storage servers made by NetApp, Inc. of Sunnyvale, Calif.

A storage server provides various types of storage services to networked clients. One useful feature of some storage servers is the ability to create different types of storage structures for storing data. For example, a read-only Persistent Point-in-time Image (PPI), or "snapshot", of a dataset can be useful for backup, restore, and/or security purposes (the term "snapshot" is used in this document without derogation of any trademark rights of NetApp, Inc.). A read-only PPI not only captures the exact state of the dataset at the time of the PPI's creation, but also prevents unauthorized or mistaken modification or deletion of any data contained therein. However, in some instances a PPI might contain sensitive or confidential data, such as social security numbers, credit card numbers, birthdates, etc. It may be undesirable to retain such data indefinitely. Consequently, a problem exists of how to carry out authorized deletion of selected sensitive or confidential data captured in a PPI.

BRIEF DESCRIPTION OF THE DRAWINGS

One or more embodiments of the present invention are illustrated by way of example and not limitation in the figures of the accompanying drawings, in which like references indicate similar elements and in which:

FIGS. 6A-6D illustrate exemplary scenarios of data storage in multiple storage structures;

FIGS. 9A-9H illustrates exemplary scenarios of discarding sensitive data from multiple PPIs and an active file system.

DETAILED DESCRIPTION

Figure 1:
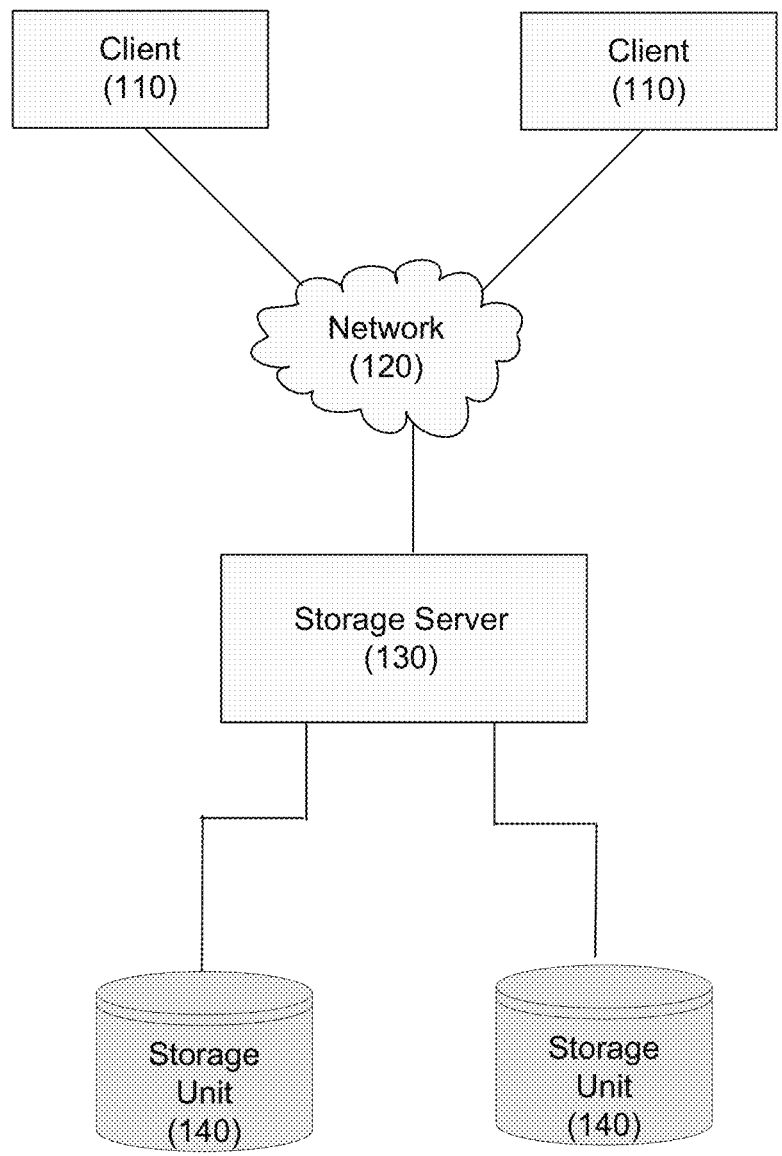
FIG. 1 illustrates a network storage system in which the present invention can be implemented.

A method and apparatus for "discarding" (rendering unrecoverable) sensitive data from a network storage server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Sensitive data, like any other data, are typically stored in one or more datasets, and managed by storage structures. A dataset can be a unit of physical data storage, such as a physical block, or a memory page, etc. It can also be a unit of logical data storage, such as a file, a volume, etc. A storage structure can be a hierarchical organization of multiple datasets for easy access, retrieval, and/or management of these datasets. An Active File System (AFS) is independently managed, self-contained storage structure in which all datasets contained therein are update-able, and are in their most up-to-date forms. A read-only storage structure, such as a Persistent Point-in-time Image (PPI), can be created based on an AFS, to persistently capture the exact state of the AFS at one point-in-time. A network storage server can serve data from multiple AFSs and PPIs. The AFS and PPI may also physically share blocks which have not changed since the time the PPI was taken.

To effectively discard sensitive data captured in a read-only storage structure, such as a PPI, an encryption procedure is utilized to enable the cryptographic deletion of such sensitive data. According to the procedure, during the initial creation of the read-only storage structure, a unique original encryption key is used to encrypt all datasets before storing them into the read-only storage structure. Later, to discard the sensitive data contained in one dataset, all other datasets in the read-only storage structure are decrypted with the original encryption key, re-encrypted with another encryption key, and copied to a different storage structure for preservation. Afterward, the original encryption key is shredded; thereby effectively rendering the sensitive data unrecoverable (discarded).

In certain situations, the dataset that contains sensitive data is referenced by multiple PPIs. To assure that the sensitive data is made unrecoverable, each PPI is processed in similar fashion to remove any reference to the sensitive data. A PPI can also reference datasets that are encrypted with multiple encryption keys. After the discarding of datasets encrypted with one specific key, the PPI can still provide limited accesses to the rest of datasets using these datasets' respective keys. However, any request for a dataset for which the encryption key was shredded will receive a data-not-available response. Such "holes" in a PPI can render the PPI a non-consistent storage structure. Alternatively, the non-consistent PPI might be deleted after the shredding of the encryption key associated with the sensitive data. Further, all sources that could be used to derive the original encryption key are shredded to prevent the recovery of the original encryption key. This includes any key encryption keys that were used to directly or indirectly encrypt/decrypt the original key itself.

Refer now to FIG. 1, which shows a network storage system in which the present invention can be implemented. In FIG. 1, a storage server 130 manages multiple storage units 140 that include multiple non-volatile mass storage devices (not shown), and provides storage services to a set of clients 110 through a network 120. The network 120 can be, for example, a local area network (LAN), wide area network (WAN), metropolitan area network (MAN), global area network such as the Internet, a Fibre Channel fabric, or any combination of such interconnects. Each of the clients 110 can be, for example, a conventional personal computer (PC), server-class computer, workstation, handheld computing/communication device, or the like.

Storage of data in the storage units 140 is managed by the storage server 130. The storage server 130 receives and responds to various read and write requests from the clients 110, directed to data stored in or to be stored in the storage units 140. The storage units 140 can be, for example, conventional magnetic or optical disks or tape drives; alternatively, they can be non-volatile solid-state memory, such as flash memory. The mass storage devices in storage units 140 can be organized as a Redundant Array of Inexpensive Disks/Devices (RAID), in which case the storage server 130 accesses the storage units 140 using one or more well-known RAID protocols.

The storage server 130 can be a file-level server such as used in a NAS environment, a block-level storage server such as used in a SAN environment, or a storage server which is capable of providing both file-level and block-level service. Further, although the storage server 130 is illustrated as a single unit in FIG. 1, it can have a distributed architecture. For example, the storage server 130 can include a physically separate network module (e.g., "N-blade") and disk module (e.g., "D-blade") (not shown), which communicate with each other over an external physical interconnect.

Figure 2:
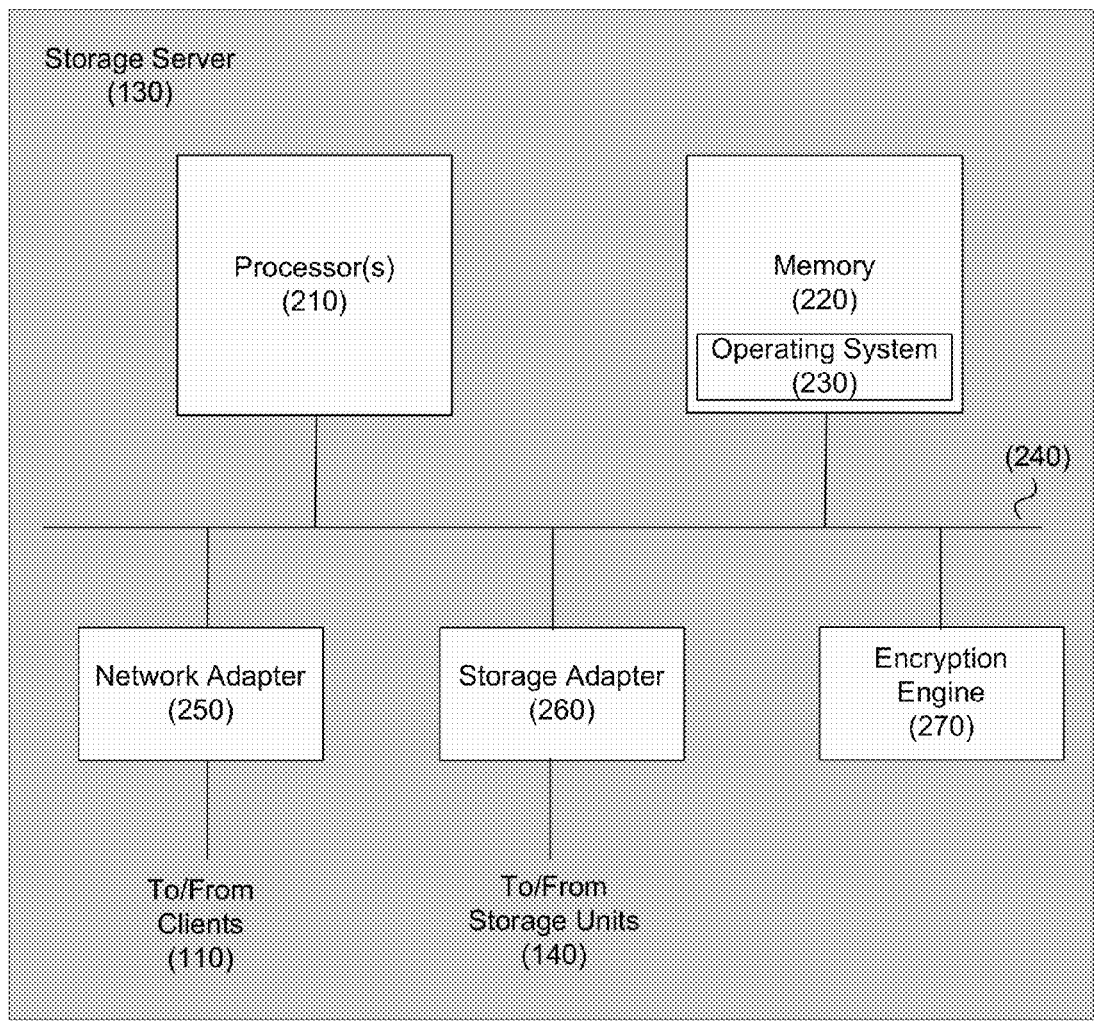
FIG. 2 is a high-level block diagram showing an example of the architecture of the storage server.

FIG. 2 is a high-level block diagram showing an example of the physical architecture of a storage server 130 of FIG. 1. The storage server 130 includes one or more processors 210 and memory 220 connected via an interconnect 240. The interconnect 240 shown in FIG. 2 is an abstraction that represents any one or more separate physical buses, point-to-point connections, or both connected by appropriate bridges, adapters, or controllers. The interconnect 240, therefore, can include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 210 can include central processing units (CPUs) of the storage server 130 and, thus, control the overall operation of the storage server 130. In certain embodiments, the processor(s) 210 accomplish this by executing software or firmware stored in memory 220. The processor(s) 210 can be, or can include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the storage server 130. The memory 220 represents any form of random access memory (RAM), read-only memory (ROM), flash memory (as discussed above), or the like, or a combination of such devices. In use, the memory 220 can contain, among other things, at least a portion of the storage operating system 230 of the storage server 130.

Also connected to the processor(s) 210 through the interconnect 240 are a network adapter 250 and a storage adapter 260. The network adapter 250 provides the storage server 130 with the ability to communicate with remote devices, such as clients 110, over the network 120 of FIG. 1, and can be, for example, an Ethernet adapter or Fibre Channel adapter. The storage adapter 260 allows the storage server 130 to access the storage units 140 and can be, for example, a Fibre Channel adapter or a SCSI adapter.

In one embodiment, the storage server 130 includes an encryption engine 270 to perform data encryption/decryption based on encryption keys. The encryption engine 270 can also be configured to protect plaintext encryption keys, and/or to store and retrieve encryption keys based on key identifiers. The encryption engine 270 can be implemented as a processor on the interconnect 240. Alternatively, the encryption engine can be software instructions that can be loaded into memory 220, and to be executed by processor 210. Further, the encryption engine 270 can be in a device external to the storage server 130 (not shown in FIG. 2).

Figure 3:
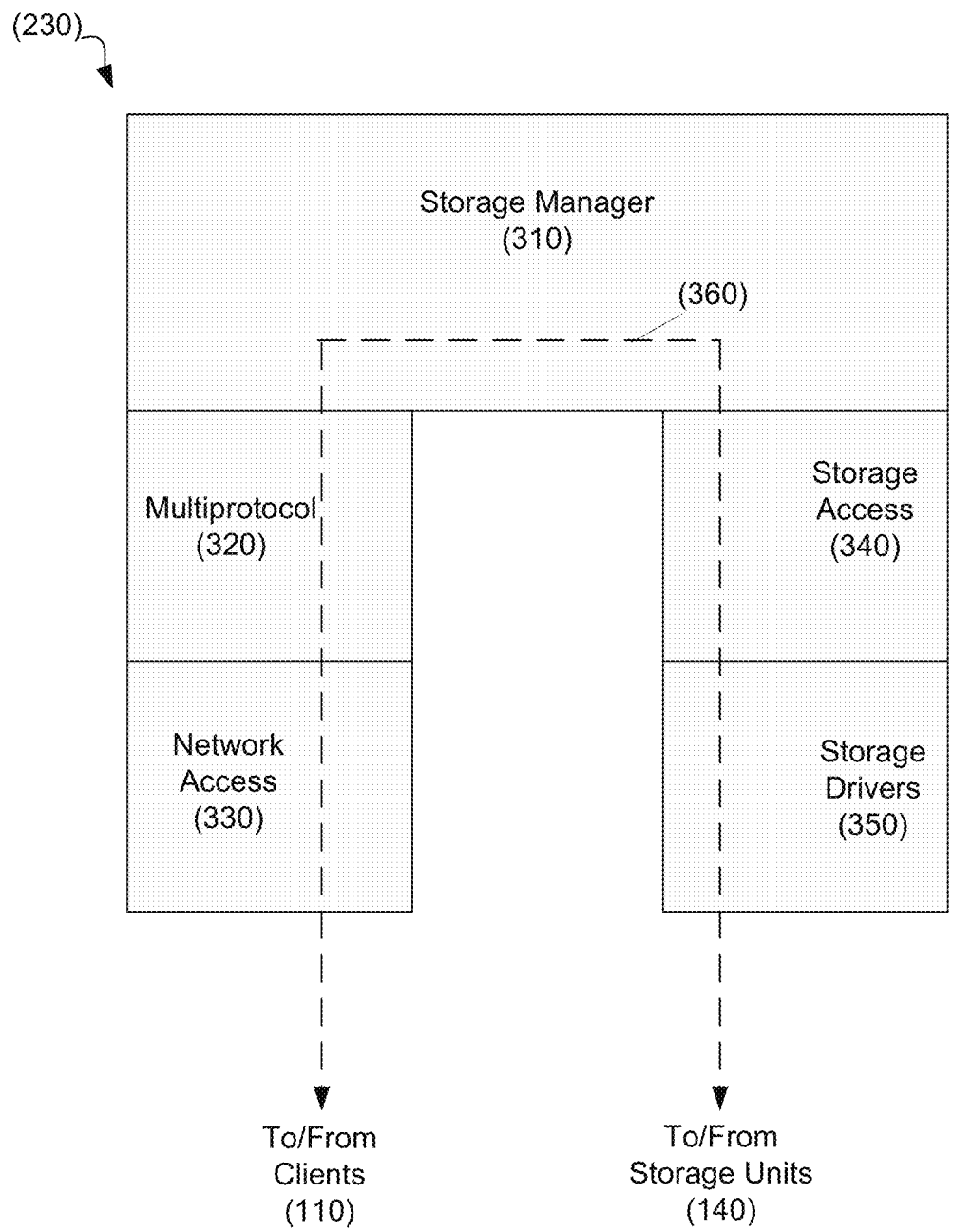
FIG. 3 illustrates an example of a storage operating system implemented within a storage server.

FIG. 3 schematically illustrates an example of a storage operating system that can be implemented in the storage server 130. The storage operating system 230 performs data management and services client-initiated data access requests (among other operations). In the illustrated embodiment, the storage operating system 230 includes several software modules, or "layers." These layers include a storage manager 310, which is the core functional element of the storage operating system 230. The storage manager 310 is application-layer software which imposes a structure (e.g., a hierarchy) on the data stored in the storage units 140 and which services read and write requests from clients 110. In certain embodiments, the storage manager 310 manages a log-structured file system and implements a "write out-of-place" (also called "write anywhere") policy when writing data to the storage units 140. In other words, whenever a logical data block is modified, that logical data block, as modified, is written to a new physical storage location (physical block), rather than overwriting the data block in place.

Logically "under" the storage manager 310, to allow the storage server 130 to communicate over the network 120 (e.g., with clients 110), the storage operating system 230 also includes a multiprotocol layer 320 and a network access layer 330. The multiprotocol 320 layer implements various higher-level network protocols, such as Network File System (NFS), Common Internet File System (CIFS), Hypertext Transfer Protocol (HTTP) and/or Internet small computer system interface (iSCSI). The network access layer 330 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also logically under the storage manager 310, to allow the storage server 130 to communicate with the storage units 140, the storage operating system 230 includes a storage access layer 340 and an associated storage driver layer 350. The storage access layer 340 implements a higher-level disk storage protocol, such as RAID-4, RAID-5 or RAID-DP, while the storage driver layer 350 implements a lower-level storage device access protocol, such as Fibre Channel Protocol (FCP) or small computer system interface (SCSI). Also shown in FIG. 3 is the path 360 of data flow through the operating system 230, associated with a read or write operation, from the client interface to the storage unit interface. Thus, the storage manager 310 accesses the storage units 140 through the storage access layer 340 and the storage driver layer 350.

Figure 4:
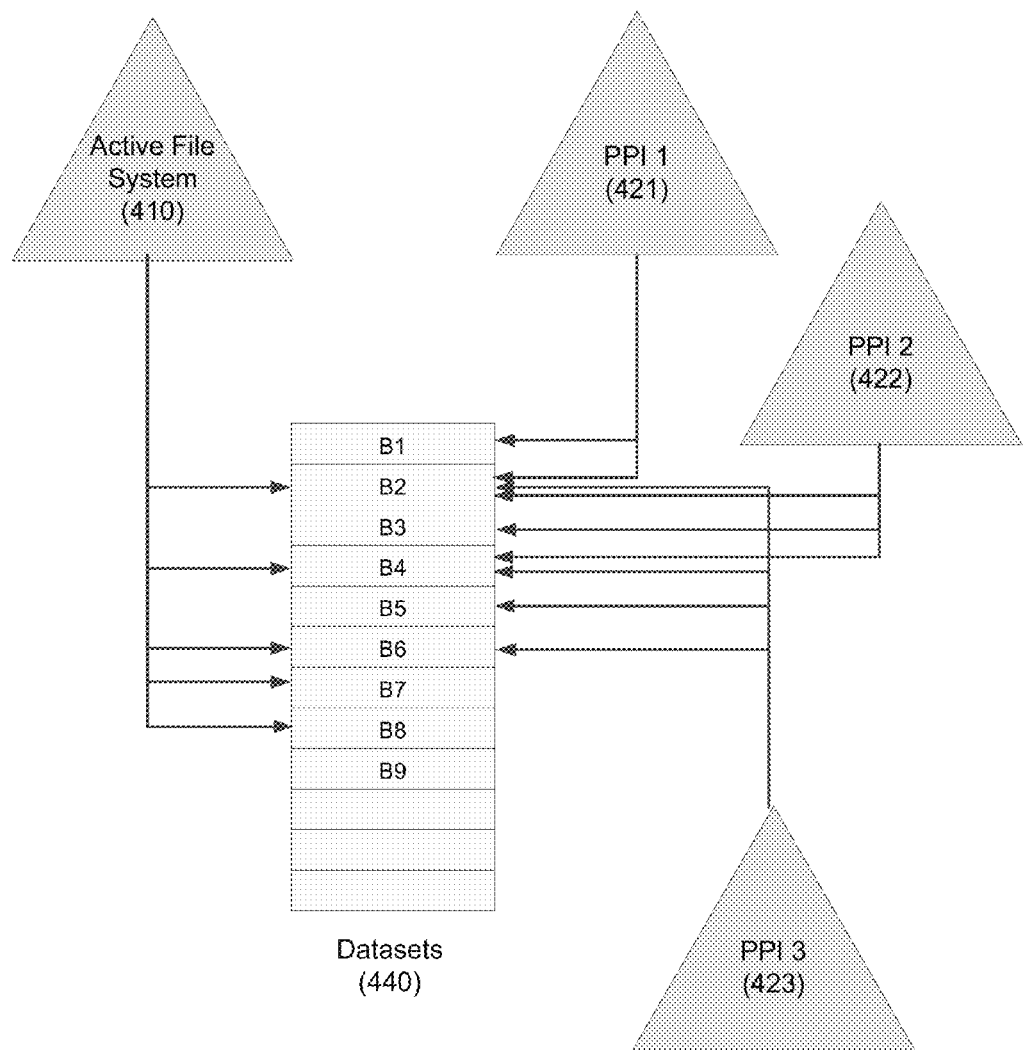
FIG. 4 illustrates multiple storage structures in a storage server.

FIG. 4 schematically illustrates various storage structures implemented by a storage operating system 230 in the storage server 130, according to certain embodiments of the present invention. A dataset can be a unit of physical data storage, such as a physical block, a memory page, a logical unit number (LUN), a volume, etc. A physical block is a sequential, fixed-length unit of physical storage, abstracted by a storage system for the purpose of storing and/or retrieving physical data. A memory page is a contiguous fixed-length unit of memory utilized in memory allocation. A dataset can also be a unit of logical data storage, such as a file, a binary large object (BLOB), etc. In datasets 440, each of the datasets B1-B9 can be allocated and referenced by various storage structures, such as the Active File System (AFS) 410 and PPIs 421, 422 and 423.

In one embodiment, a storage structure organizes multiple datasets hierarchically into a structure for easy access, retrieval, and/or management of the datasets. AFS 410 is an example of such an independently managed, self-contained, storage structure for managing datasets such as files, blocks, memory pages, Logical Unit Numbers (LUNs), volumes, and/or other logical storage units. In a NAS environment, AFS 410 can manage datasets such as volumes, files, directories, etc. Alternatively, in storage environment that organizes data in block formats, such as SAN, AFS 410 can manage datasets such as LUNs and/or blocks, or other logical or physical storage units. Thus, the terms "active file system" and "file system" are not limited to a system for the management of files per se.

In one embodiment, AFS 410 is a write-out-of-place file system. In a write-out-of-place file system, whenever a dataset is modified, it is written to a new physical location on disk, and reference to the original dataset is transferred to the dataset at the new physical location. The original dataset is not modified, and is still in existence on disk after the modification. This is in contrast with a write-in-place approach, where a dataset, when modified, is written in its modified form back to the same physical location on disk, and the previous contents on the physical location is no longer preserved. Further, a write-out-of-place file system can manage references to the datasets in a similar fashion. Thus, any update to a reference is written to a new physical location on disk, leaving the original reference unmodified.

Referring to the example illustrated in FIG. 4, AFS 410 is referencing dataset B4. If a request for modification of data stored in B4 is received, AFS 410 would allocate a new dataset, for example, B9, for the storage of the modified data, and move the reference that used to point to B4 to instead point to B9. When a user requests deletion of data stored in B4, AFS 410 simply removes the reference pointing to B4, without physically affecting the data stored in B4. After modification or deletion, the original data in B4 remains preserved, and can still be accessed via other references (if any exist), such as references from other storage structures, e.g., PPIs 422 or 423. If no other storage structure references B4, then the physical space at B4 can be reclaimed by storage server for future use.

In one embodiment, AFS 410 provides update capabilities, and maintains the most up-to-date references, to its datasets. A read-only storage structure, such as a PPI, can be created based on a storage structure such as AFS 410. A PPI persistently captures the exact state of the AFS 410 at the time the PPI is created. The exact state of an AFS 410 can include datasets, references to datasets, and/or all file system metadata such as inodes, directories, bitmaps, indirect blocks, volume, or LUN, etc. A PPI can also be referred to as a snapshot. Once created, a PPI provides a simple mechanism to restore datasets to a known previous point in time, in the event of data corruption or accidental deletion. Thus, at the time of creation, a PPI contains one or more datasets, and shares the one or more datasets with the active file system, or any other storage structure from which it is created.

In one embodiment, creation of PPI does not require duplication of datasets in an AFS 410 that implements write-out-of-place policy. By making a copy of the AFS 410's entire metadata, a PPI can be quickly created with its own independent references to the same datasets referenced by the AFS 410. Since PPI does not allow modification or deletion of its contents, and modification or removal of dataset from the write-out-of-place file system results in the allocation of new dataset at a different physical location, all datasets referenced by the PPI are read-only.

In another embodiment, a PPI is created by duplicating certain root structures, without copying the entire metadata, of the AFS 410. Such approach allows the sharing of references between PPI and AFS 410, which significantly reduces the amount of storage required in creating PPIs. Since in a write-out-of-place file system, modification of metadata is performed in a similar fashion as modification of datasets (i.e., by writing out of place, which results in the creation of new metadata for the AFS 410), a PPI is thus able to reuse a significant amount of metadata of the AFS 410. Alternatively, the AFS 410 can include references in a PPI, for any metadata or datasets that have not been modified since the PPI was created. Thus, in the metadata tree structure, the lowest level references (leaves) point to datasets containing user data. The upper levels of the root structure hold references pointing to the leaves, or other root structures at the lower levels. When an out-of-place write is done for a dataset at the lowest level, all datasets in the path from this modified dataset to the root of the tree structure are written to a different location.

Using the example illustrated in FIG. 4, PPI 1 421 captures the AFS 410 at one specific historical time when it referenced two datasets B1 and B2. PPI 2 422 is created when the AFS 410 referenced three datasets B2, B3 and B4. And PPI 3 423 is created when AFS 410 referenced datasets B2, B4, B5 and B6. AFS 410 is since evolved to reference B2, B4, B6, B7 and B8 datasets. Thus, datasets B1-B6 are read-only, as they are referenced by PPI 1 421, PPI 2 422, and PPI 3 423. Datasets B7-B8 are read-only in the sense that any updates of them in AFS 410 would result in the allocation of new datasets. However, if no other PPI references B7-B8, the updates in AFS 410 would render B7-B8 inaccessible.

An issue arises when situation requires the discarding of sensitive data stored in one of the read-only datasets such as B1 of FIG. 4. B1 is accessible only via PPI 1 421, and there is no mechanism to delete sensitive data in B1 through PPI 1 421. And even the destruction of PPI 1 421 only results in the removal of its reference to B1. Sensitive data remain recoverable as such data are still physically present in storage until their storage space is reclaimed and then overwritten. Further the read-only PPIs may have been backed-up and archived to tapes or other media. Thus, in certain embodiments of the present invention, to render sensitive data unrecoverable (discard the sensitive data), encryption/decryption is utilized to implement the secure discarding of sensitive data stored in read-only storage structures, such as PPIs, etc.

In one embodiment, encryption is the process of transforming data (cleartext) into an incomprehensible or hidden form (ciphertext) through the use of an encryption key. Decryption is the reverse process of encryption. An encryption key is a code or number which, when taken together with an encryption algorithm, defines a unique transformation of the data being encrypted or decrypted. Encryption algorithms include conventional algorithms defined under the Advanced Encryption Standard (AES), or other appropriate algorithms. The encryption key, which can also be referred to as data key, may itself also be encrypted by another key, called a "wrapping key" (or multiple wrapping keys) to further increase security. Thus, wrapping keys, also called key encryption keys, are keys delegated to only encrypt other keys.

A "cryptainer" is a term used herein to refer to a storage unit or storage device in which the encrypted data is stored. In the context of a SAN environment, a cryptainer can be, e.g., a disk, a region on the disk or several regions on one or more disks that constitutes a LUN, etc. In the context of a NAS environment, a cryptainer can be, e.g., a collection of files on one or more disks, a directory, a file, multiple segments within one file, etc. In other environments, a cryptainer might be a mount point, a share, or multiple tape blocks, etc. Each cryptainer is associated with its own encryption key, e.g., a cryptainer key, which might be used by security applications to encrypt and/or decrypt the data stored in the cryptainer. Alternatively, the cryptainer key can be used to encrypt and/or decrypt metadata associated with the cryptainer.

Figure 5:
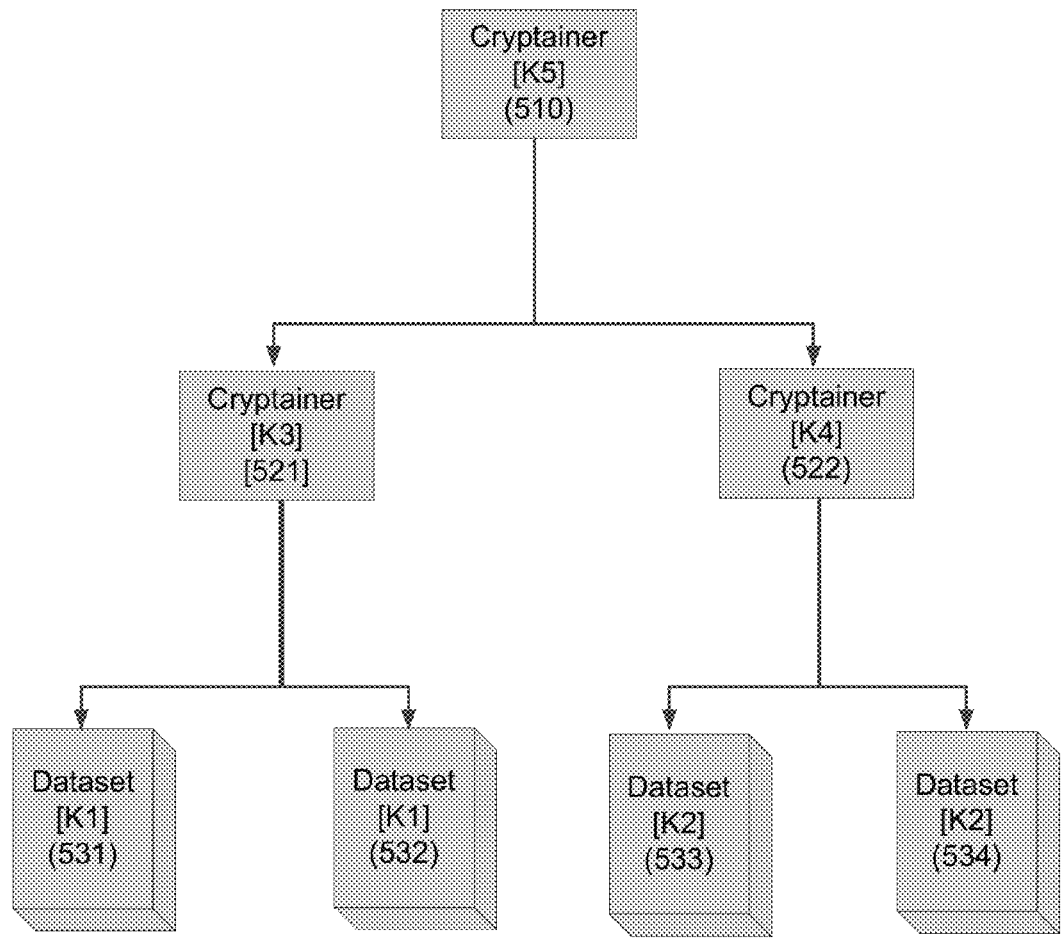
FIG. 5 illustrates an example of multi-level encryptions of a storage server.

FIG. 5 schematically illustrates multiple levels of encryption implemented on a storage structure, according to certain embodiments of the present invention. In FIG. 5, a storage structure is organized into multiple cryptainers and datasets. Datasets 531 and 532 are encrypted using data key K1, and stored in cryptainer 521. Likewise, datasets 533 and 534 are encrypted using data key K2, and stored in cryptainer 522. In one embodiment, data key such as K1 is stored in a specific metadata portion of datasets 531 and 532, and is used to encrypt/decrypt the data portion of datasets 531 and 532. Alternatively, a key identifier is stored in the specific metadata portion of datasets 531-532 for the identification of key K1. A data security application can utilize the key identifier to retrieve the encryption key K1 from a key management system (not shown in FIG. 5). Encryption policies can be flexible and allow for new keys to be used after every 10000 writes with an existing key. In one embodiment, each time an encrypted dataset is written to storage, it is tagged with a "time-tracker" called CP_COUNT (Consistency Point Count). This CP_COUNT tag can include other metadata about the dataset such as its checksum, id, etc. During data process, the CP_COUNT is used to retrieve an encryption key from a table that maps time-ranges (CP_COUNT ranges) into a key identifier for identifying the encryption key.

In one embodiment, Cryptainers 521 and 522 are associated with cryptainer keys K3 and K4 for secure storing of data keys. A cryptainer key can be used to encrypt the data portion of the cryptainer, so that the datasets referenced by the cryptainer cannot be identified without the correct cryptainer key. However, any other authorized cryptainers with references to the datasets in the cryptainer can still obtain the data keys for these datasets from the key management system based on key identifiers stored in a field such as CP_COUNT of the datasets.

Alternatively, a cryptainer key can also serve as a wrapping key to encrypt/decrypt the data keys used to encrypt datasets contained in the cryptainer. If the data keys for the datasets are embedded in the metadata portion of the datasets, the cryptainer key might be used to encrypt/decrypt the metadata portion of the datasets, so that without the cryptainer key, data cannot be extracted even when an unauthorized user obtains access to the datasets. Likewise, a cryptainer key might be used to encrypt/decrypt data keys that are obtained via the key identifiers.

In the example illustrated in FIG. 5, cryptainer 521 is associated with a cryptainer key K3 that can be used to encrypt key K1 for datasets 531 and 532. And cryptainer 522 is associated with a cryptainer key K4 to encrypt key K2 for datasets 533 and 534. In a situation when datasets such as 531 and 532 are encrypted with different data keys, wrapping key K3 can be used to encrypt these different data keys. Further, a higher level cryptainer 510 can contain cryptainer 521 and 522, and can use key K5 to encrypt cryptainer keys K3 and K4. Therefore, a user may gain access to data in datasets 531-534 only when the user has access to K5, in order to obtain keys K3 and K4, which in turn are used to obtain K1 and K2 for decrypting datasets 531-534.

In one embodiment, AFS 410 and PPIs 421-423 of FIG. 4 are implemented as cryptainers, such as cryptainers 521 and 522 in FIG. 5. Further, a storage unit 140 of FIG. 1 can be implemented as a cryptainer, such as cryptainer 510. This approach is advantageous because it adds additional security to the management of heterogeneous storage structures, especially in situations when these storage structures are mirrored or replicated in multiple geographically-dispersed locations. Also, compromising the data key for a specific dataset would not jeopardize the security of the rest of data in the storage system. Such approach also allows the easy implementation of cryptographic deletion of datasets from the cryptainer.

According to an embodiment of present invention, to cryptographically delete specific encrypted data, the corresponding data key is deleted (shredded). But before the data key that was used to encrypt the data is shredded, all other data that were encrypted with the same data key (i.e., the datasets to be retained) are re-keyed with a new data key. "Re-keying" denotes the process of generating a new data key, decrypting a dataset with its original data key, and re-encrypting the decrypted dataset with the new data key. Once its data key is shredded, the un-rekeyed dataset is cryptographically deleted in a sense that it becomes unrecoverable.

In one embodiment, the data key to be "shredded" is encrypted with a wrapping key. To ensure that the encrypted data key is not recoverable, the wrapping key for the data key is shredded in a similar fashion. Thus, any keys encrypted by the wrapping key to be shredded are rekeyed with a new wrapping key. Once the wrapping key is shredded, any higher level wrapping keys that are utilized to encrypt the shredded wrapping key can also be shredded in a similar fashion.

In the example illustrated in FIG. 5, to cryptographically delete data contained in dataset 531, dataset 532 is first re-keyed with a new key before data key K1 is shredded. Afterward, data contained in dataset 531 becomes unrecoverable as long as its data key K1 is unrecoverable. In situation when K3 is a wrapping key for data key K1, to prevent the recovery of K1 through K3, K3 is shredded, and a new key is assigned to cryptainer 521 as a wrapping key for the encrypting of data key for dataset 532. Further, since wrapping key K5 of cryptainer 510 is used to encrypt keys K3 and K4, to prevent the recovery of key K3, K5 is shredded in similar fashion. Thus, a new wrapping key for cryptainer 510 is selected to encrypt the new wrapping key for cryptainer 521, and original wrapping key K4 for cryptainer 522. With the shredding of key K1, K3 and K3, data contained in dataset 531 is rendered cryptographically deleted.

In one embodiment, to effectively discard sensitive data captured in a read-only storage structure, such as a PPI, datasets are initially encrypted with a data encryption key at the time of their creation. A write-out-of-place active file system can use multiple encryption keys for encrypting all datasets it allocated for creation and modification. Once a PPI is created based on another storage structure, such as an AFS, the creation of the PPI triggers the generating of a new data key to be used for creating any new datasets in the AFS. The old data key is used to decrypt the datasets not modified after the PPI creation, or datasets referenced by the PPIs.

In one embodiment, each cryptainer in FIG. 5 structure is stored in a corresponding dataset; and all datasets 510, 521-522, and 531-534 are encrypted with a common encryption key. Datasets 521-522, which are known as leaves (the lowest level of the structure), directly reference datasets 531-534. High level dataset 510 directly references leaves 521-522, and indirectly references datasets 531-534 through leaves 521-522. Further, higher level datasets (not shown in FIG. 5) can directly reference dataset 510, and indirectly reference datasets 521-522, and datasets 531-534. Such approach is advantageous because during data discarding, all datasets that are encrypted with an encryption key can be quickly ascertained by locating the high-level datasets encrypted with the encryption key, with certainty that lower-level datasets directly or indirectly referenced by the high-level datasets are also encrypted with the same key.

FIGS. 6A-6D illustrate a chronological sequence of examples of how encryption can be implemented on an AFS and PPIs, in accordance with certain embodiments of present invention. FIG. 6A shows an initial point in time at which AFS references two datasets B1 and B2, each of which is encrypted using a data key K1 associated with AFS. FIG. 6B illustrates a subsequent point in time when PPI 1 is created based on AFS of FIG. 6A, and the creation of PPI 1 triggers the AFS to use a new data key K2 for the allocations of datasets B3 and B4. The reference to dataset B1 is removed when the AFS either modifies, or deletes data stored in B1. FIG. 6C illustrates a PPI 2 subsequently being created based on AFS of FIG. 6B. Again the creation of PPI 2 triggers the AFS to use a new data key K3 for the allocations of datasets B5 and B6. And reference to dataset B3 is subsequently removed in AFS.

FIG. 6D illustrates a PPI 3 being created based on AFS of FIG. 6C. A new key K4 is generated for the allocations of datasets B7 and B8 once the PPI 3 is created. And reference to B5 is removed from the AFS. Thus, to access its datasets, AFS of FIG. 6D is required to locate K1 based on CP_COUNT field of B2, in order to decrypt data stored in B2; locate K2 based on CP_COUNT field of B4 to decrypt data stored in B4; and locate K3 based on CP_COUNT field of B6 to decrypt data stored in B6. Likewise, AFS of FIG. 6D needs to locate K4 to decrypt data sets B7 and B8. Thus, datasets B1-B6 are read-only, as they are referenced by one or more of the PPIs, and cannot be modified via AFS or PPIs.

Figure 7:
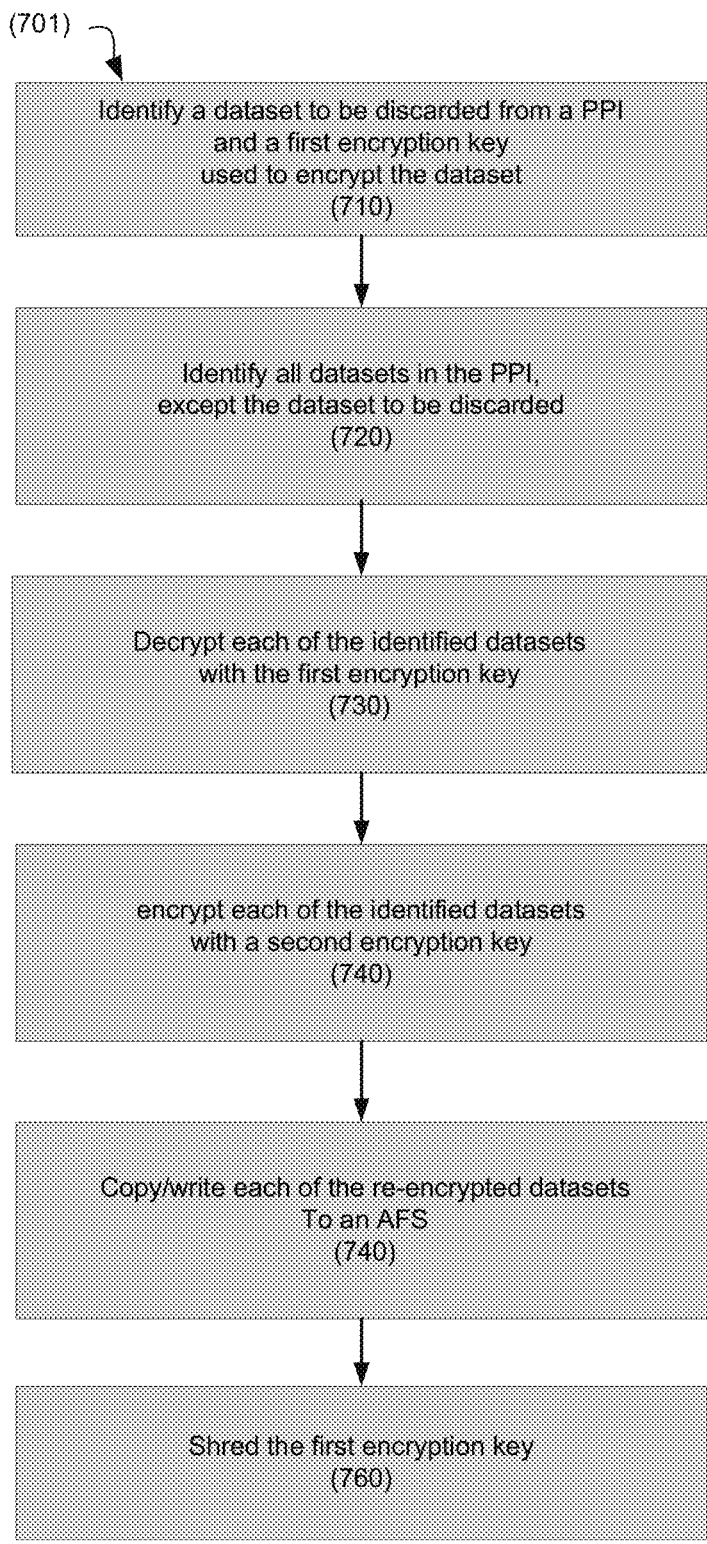
FIG. 7 is a flow diagram showing an exemplary process in a storage server for discarding sensitive data from a PPI.

FIG. 7 is a flow diagram of a process 701 for discarding sensitive data from a PPI, in accordance with one embodiment of the present invention. The process 701 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, process 701 is executable by the operating system 230 of FIG. 2, installed in storage server 130 of FIG. 1.

Referring back to FIG. 7, at 710, process 701 first identifies the dataset which contains sensitive data that need to be discarded from a read-only storage structure, e.g., a PPI, etc., and a first encryption key that was used to encrypt this dataset. Once the dataset and the key is identified, process 701 proceeds to 720 to identify all other datasets referenced by the PPI, excluding the dataset with sensitive data to be discarded. At 730, each of the datasets identified at 720 is decrypted with the first encryption key used for encryption these datasets. Afterward, at 740, all the datasets decrypted at 730 are re-encrypted (re-keyed) with a newly generated second encryption key. Once re-encrypted, a metadata field, such as CP_COUNT, of the re-encrypted datasets is populated with a key identifier for the new key, so that later, other processes can obtain this new key for decryption of the re-encrypted datasets. At 750, the re-encrypted datasets are copied to a writeable storage structure, such as an AFS. Afterwards, at 760, the first encryption key is shredded, rendering the dataset in the PPI with sensitive data unrecoverable. Thus, even though no modification is performed on any of the datasets in the read-only storage structure, embodiments of the present invention cryptographically delete the dataset with sensitive data. Although all other datasets that are encrypted with the first encryption key and referenced by the PPI are unrecoverable as well, because the data contained therein are re-keyed and copied to another writable storage structure, these datasets are preserved, and not discarded. Afterward, a new read-only storage structure such as PPI can be created based on these copied datasets to restore the read-only status of these datasets.

In one embodiment, the existing PPI after the shredding of its encryption key is also deleted, thus leaving the dataset with sensitive data inaccessible from any storage structures. Alternatively, the existing PPI can maintain references to datasets encrypted with different data keys, such as in the case of PPI 2 and PPI 3 of FIG. 6D. In such cases, the existing PPI can still provide services to all other datasets that are not encrypted with the shredded key. And for service requests of the datasets encrypted with the shredded key, a "data-not-available" message or the like can be returned as the response to the service requests. Alternatively, no data or permission denied errors can be raised as exceptions to the service requests.

In one embodiment when cryptainer keys or other wrapping keys are utilized for encrypting the shredded key, to make certain that the shredded key is not recoverable, these cryptainer keys or wrapping keys can be shredded and/or re-keyed, and any data encrypted with these cryptainer keys or wrapping keys can be discarded/rekeyed in a similar fashion.

Figure 8:
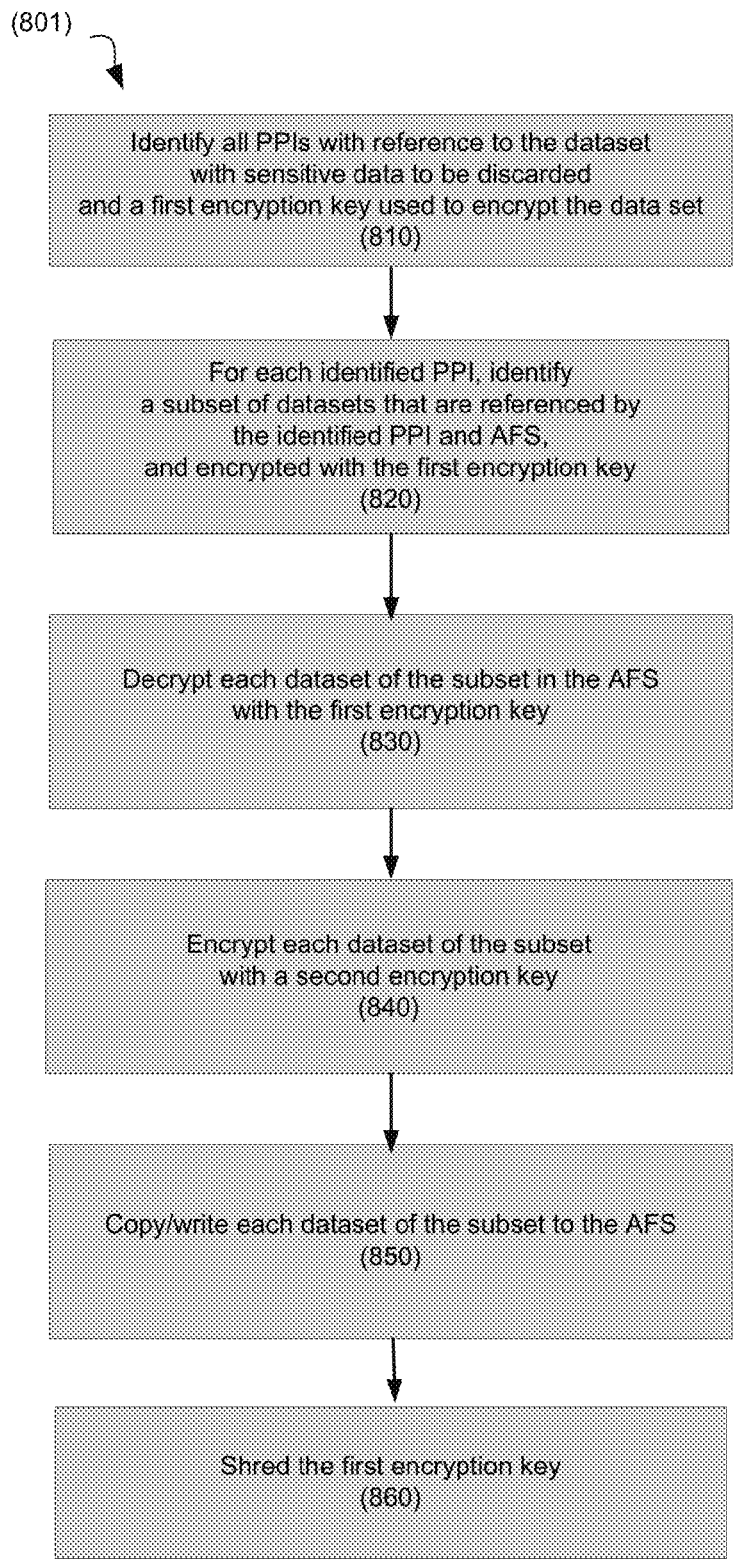
FIG. 8 is a flow diagram showing an exemplary process in a storage server for discarding sensitive data from multiple PPIs.

FIG. 8 illustrates a flow diagram of a process 801 for discarding sensitive data from multiple PPIs and an AFS, in accordance with one embodiment of the present invention. The process 801 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, process 801 is executable by the operating system 230 of FIG. 2, installed in storage server 130 of FIG. 1.

Referring back to FIG. 8, at 810, after identified the particular dataset containing sensitive data to be discarded and a first encryption key used to encrypt it, all PPIs with reference to the particular dataset are identified. In one embodiment, identification of PPIs involves scanning each PPI's hierarchical metadata structure in search of the reference to the particular dataset. Alternatively, the encryption key identifier embedded in datasets can be used to narrow down the search range of PPIs. For example, if a new key's creation was triggered by the creation of a PPI, then any PPIs in existence before the creation time of the new PPI could not reference datasets that are encrypted with the new key. Similarly, if the scanning result indicates that the dataset is not referenced by one specific PPI, then any PPIs created after the specific PPI could not reference the dataset either.

Referring again to the example illustrated in FIG. 6D, if the sensitive data is stored in dataset B1, once process 801 determines that PPI 2 has no reference to B1, then any subsequent storage structures, including PPI 3 and AFS, could not contain reference to B1. Similarly, if the sensitive data is stored in dataset B5, and B5 is encrypted by key K3, process 801 could conclude that any PPIs in existence before the creation date of K3 could not contain reference to B5. Thus, PPI 1 and PPI 2 could be excluded from the search result.

Referring back to FIG. 8, for each of the identified PPIs that contains reference to the dataset to be discarded, 820 identifies a subset of datasets that are not only commonly referenced by the AFS and the identified PPI, but also encrypted with the same key as the dataset to be discarded, i.e., the first encryption key. Since shredding the first encryption key also renders other datasets that are encrypted with the same key unrecoverable, method 801 would ensure that all datasets that are encrypted with the first encryption key, and currently referenced by the AFS are properly transferred to the AFS.

In one embodiment, the current PPI is compared with an immediate previous PPI with respect to references to datasets. The comparison reduces the number of datasets to be evaluated at 820 by eliminating references to datasets that are also present in the previous PPI. Afterward, the result list of datasets is compared with the AFS to generate a subset of datasets that are referenced in AFS and encrypted with the key to be shredded. The subset includes datasets that are needed by the AFS, and are only available in the current PPI. Alternatively, the current PPI can be compared directly with the AFS to generate a subset of datasets that are referenced both by the current PPI and the AFS, and are encrypted with the key to be shredded. When the metadata tree structure of the AFS and PPIs are encrypted with a common encryption key, the comparison of the AFS and PPIs can be quickly performed by comparing their high-level datasets. If an high-level dataset of the AFS uses the same encryption key as the corresponding high-level dataset of a PPI, then the entire substructure under these corresponding high-level datasets also use the same key, thus allowing efficient identifying of datasets need to be re-encrypted and written into the AFS.

At 830, each dataset in the subset that is identified at 820 and in the AFS is decrypted with the key to be shredded. And at 840, these decrypted datasets are re-encrypted with a second encryption key. In one embodiment, the second encryption key is the key currently used by the AFS. At 850, each dataset of the subset is copied to the writeable file system, e.g., the AFS. Once completed, at 860, the first encryption key is shredded, thus cryptographically deleting the dataset that contains sensitive data.

FIG. 9A-9H illustrates multiple scenarios of discarding a dataset, in accordance with embodiments of present invention. In FIG. 9A, dataset B1 is identified to contain sensitive data to be deleted (cross pattern mark indicates sensitive data), and only PPI 1 is identified to reference B1. Afterward, a comparison with the AFS determines that B2 is required for AFS and encrypted with K1, and would become unrecoverable once K1 is shredded. Therefore, B2 is rekeyed with K4 (current encryption key associated with AFS), and copied to B9 (dotted pattern mark indicates data being copied from, and the vertical line pattern mark indicates data being copied to). Once K1 is discarded. B1 and B2 are rendered cryptographically deleted. Since AFS is a writable file system, it needs to change the reference of B2 to B9, and the AFS file system structure remains consistent. In one embodiment, PPI 1, PPI 2 and PPI 3 are deleted, since they contain reference to B2 that is no longer recoverable. Alternatively, PPI 2 and PPI 3 remain in existence, and any request for B2 would receive a data-not-available, a no-data, and/or a permission-denied response, etc.

In FIG. 9B, B2 is identified with sensitive data for deletion, and PPI 1, PPI 2 PPI 3 are identified with references to B2. And comparison of PPI1 with AFS reveals that there is no dataset needed to be copied to AFS. In one embodiment, PPI 2 is first compared with the immediate prior PPI, i.e., PPI 1. The comparison narrows the datasets to B3 and B4. And a further comparison with AFS shows that B3 is not referenced by AFS, and B4 is already referenced by AFS. Since B4 is not encrypted with K1, No further action is required for PPI 2. Similarly, for PPI 3, a comparison with its immediate prior PPI 2 results in a narrowed list of B5 and B6. And since B5 is not in AFS, and B6 is not encrypted with K1, no further action is required for PPI 3. Thus key K1 is shredded, and reference to B2 in AFS is removed. And sensitive data in B2, along with data in B1, becomes unrecoverable. In one embodiment, PPI 1, PPI 2 and PPI 3 are deemed inconsistent and are thereby removed. Alternatively, PPI 2 and PPI 3 can still be preserved to provide datasets encrypted with keys other than K1.

In FIG. 9C, B3 is identified with sensitive data for deletion. Based on the creation time of K2, PPI 1 can be eliminated from the identification. Also, since PPI 3 does not contain reference to B3, no PPIs created later than PPI3, nor AFS could reference B3. Thus, only PPI 2 is identified containing reference to B3. A comparison of PPI 2 and AFS shows that B4 is keyed with K2, and is required in AFS. After decrypting B4 with K2 and rekeying with K4, the rekeyed data is copied to B9. And key K2 is shredded. Shredding of K2 renders data stored in B3 and B4 unrecoverable. Subsequently, PPI 2 and PPI 3 can be deleted for lack of consistency, or be preserved to provide datasets that are not encrypted by K2.

In FIG. 9D, B4 is identified with sensitive data for deletion, and PPI 2, PPI 3 are identified with reference to B4. A comparison of PPI 2 with PPI 1 reveals a subset of B3 and B4 that are not referenced by PPI 1. Since B4 is to be discarded, and B3 is not referenced by AFS, no further action is required for PPI 2. For PPI 3, a comparison with PPI 2 results datasets B5 and B6 that are not in PPI 2. Since B5 is not referenced in AFS, and B6 is encrypted with a key other than K2, no further action will be taken for PPI 3. Thus, K2 is shredded, and reference to B4 in AFS is deleted. PPI 2 and PPI 3 can be deleted or preserved in similar fashions as in FIG. 9C situation.

Likewise, in FIG. 9E, B5 is identified containing sensitive data for deletion, and once data from B6 is rekeyed and moved to B9, K3 is shredded. And PPI 3 can be deleted or preserved. In FIG. 9F, B6 is identified for sensitive data discarding. Shredding of K3 would cryptographically delete the data in B6, and AFS needs to remove reference to B6. For FIG. 9G and FIG. 9H, since B7 and B8 are only present in writeable AFS, B7 or B8 can simply be de-referenced by AFS.

Thus, methods and systems for discarding read-only sensitive data stored in persistent point-in-time images have been described. The techniques introduced above can be implemented in special-purpose hardwired circuitry, in software and/or firmware in conjunction with programmable circuitry, or in a combination thereof. Special-purpose hardwired circuitry can be in the form of, for example, one or more application-specific integrated circuits (ASICs), programmable logic devices (PLDs), field-programmable gate arrays (FPGAs), etc.

Software or firmware to implement the techniques introduced here can be stored on a machine-readable medium and can be executed by one or more general-purpose or special-purpose programmable microprocessors. A "machine-readable medium", or a "machine-readable storage medium", as the term is used herein, includes any mechanism that provides (i.e., stores and/or transmits) information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
    creating a first Persistent Point-in-time Image (PPI) based on an Active File System (AFS), wherein the AFS references an existing dataset that is encrypted with an existing encryption key and the first PPI provides a read-only reference to the existing dataset;
    generating a new encryption key in response to creating a PPI of the AFS, wherein the new encryption key is used to encrypt subsequent data writes into the AFS; and
    in response to identifying a request to discard data that is stored in the existing dataset, included in the first PPI, and encrypted with the existing encryption key:
        re-keying the existing dataset, other than the data to be discarded, that is referenced by the AFS and encrypted by the existing encryption key; wherein said re-keying includes re-encrypting the existing dataset, other than the data to be discarded, with the generated new encryption key different from the existing encryption key;
        writing the rekeyed data to the AFS;
        shredding the existing encryption key; and
        wherein the existing encryption key is encrypted with a wrapping key and wherein shredding the existing encryption key includes shredding the wrapping key.

2. The method of claim 1, wherein generating the new encryption key includes generating the new encryption key in response to creation of the first PPI.

3. The method of claim 1, wherein generating the new encryption key includes generating the new encryption key in response to creating of a second PPI different from the first PPI.

4. The method of claim 1, wherein the AFS implements a write-out-of-place policy, wherein whenever a dataset in the AFS is modified, the modified dataset is written to a new physical location on a storage device of the AFS.

5. A data storage system comprising:
    a network interface configured to receive a request to specify a target dataset to be discarded;
    a storage interface configured to provide access to an Active File System (AFS) and one or more Persistent Point-in-time Images (PPIs), wherein each of the PPIs is created from the AFS and at least some of which are read-only;
    one or more computer processors configured to identify one or more PPIs referencing the target dataset to be discarded, wherein the target dataset to be discarded is encrypted with a first encryption key;
    at least one of the computer processors configured to:
        for each of the identified PPIs, identify a subset of datasets referenced by the identified PPIs and the AFS, at least some of the datasets in the subset having been encrypted with the first encryption key;
        wherein the target dataset to be discarded is excluded from the identified subset, and
        re-key at least some of the datasets of the subset, previously encrypted with the first encryption key, by re-encrypting the at least some of the datasets with a second encryption key different from the first encryption key; and
    wherein at least one of the computer processors is configured to shred the first encryption key.

6. The data storage system as recited in claim 5, wherein at least one of the computer processors is configured to delete PPIs that reference the target dataset to be discarded.

7. The data storage system as recited in claim 5, wherein at least one of the computer processors is configured to delete PPIs that have datasets encrypted with the first encryption key.

8. The data storage system as recited in claim 5, wherein at least one of the computer processors is configured to generate the second encryption key in response to a PPI of the one or more PPIs having been created.

* * * * *